United States Patent
He et al.

(10) Patent No.: US 6,844,980 B2
(45) Date of Patent: Jan. 18, 2005

(54) IMAGE DISPLAY SYSTEM AND ELECTRICALLY ACTUATABLE IMAGE COMBINER THEREFOR

(75) Inventors: Zhan He, Bedford Hills, NY (US); Jaujeng Lin, Yorktown Heights, NY (US)

(73) Assignee: Reveo, Inc., Elmsford, NY (US)

( * ) Notice: Subject to any disclaimer, the term of this patent is extended or adjusted under 35 U.S.C. 154(b) by 23 days.

(21) Appl. No.: 10/128,675

(22) Filed: Apr. 23, 2002

(65) Prior Publication Data

US 2002/0171940 A1 Nov. 21, 2002

Related U.S. Application Data

(60) Provisional application No. 60/285,850, filed on Apr. 23, 2001.

(51) Int. Cl.[7] .............................................. G02B 27/14
(52) U.S. Cl. ........................................ 359/630; 345/8
(58) Field of Search ............................... 359/630, 629, 359/245, 14; 345/7, 8

(56) References Cited

U.S. PATENT DOCUMENTS

| | | | |
|---|---|---|---|
| 3,697,154 A | 10/1972 | Johnson | 350/174 |
| 3,848,974 A | 11/1974 | Hosking et al. | 350/174 |
| 3,885,095 A | 5/1975 | Wolfson et al. | 178/7.88 |
| 3,887,273 A | 6/1975 | Griffiths | 353/14 |
| 3,915,548 A | 10/1975 | Opittek et al. | 350/3.5 |
| 3,940,204 A | 2/1976 | Wirthington | 350/3.5 |
| 4,190,832 A | 2/1980 | Mohler | 340/705 |
| 4,269,475 A | 5/1981 | Ellis | 350/174 |
| 4,398,799 A | 8/1983 | Swift | 350/174 |
| 4,407,564 A | 10/1983 | Ellis | 350/174 |
| 4,432,597 A | 2/1984 | Bjorklund et al. | 350/3.7 |
| 4,447,128 A | 5/1984 | Ferrer | 350/174 |
| 4,582,394 A | 4/1986 | Boyd | 350/174 |

(List continued on next page.)

FOREIGN PATENT DOCUMENTS

| | | | | |
|---|---|---|---|---|
| EP | 0326323 A2 | 8/1989 | | G09G/3/00 |
| EP | 0370773 A3 | 5/1990 | | G02F/1/1347 |
| EP | 1158336 A2 | 11/2001 | | G02B/27/01 |
| FR | 2681702 A1 | 3/1993 | | G02B/27/18 |
| GB | 2278692 A | 12/1994 | | G02B/23/10 |
| JP | 407159813 A | * 6/1995 | | G02F/1/137 |

OTHER PUBLICATIONS

International Search Report, PCT/US02/12860, mailed Aug. 1, 2002.
Li et al. "A Single-Layer Super Broadband Reflective Polarizer", SID 96 DIGEST, vol. 27, May 12, 1996, p. 111–113.
Hikmet, "Switchable Mirrors of Chiral Liquid Crystal Gels"; Liquid. Crystals, vol. 26, No. 11, p. 1645–53, 1999.

*Primary Examiner*—Ricky Mack
(74) *Attorney, Agent, or Firm*—Reveo, Inc.

(57) ABSTRACT

The present invention is directed to an image display system for displaying an image in a user's line of sight including an image combiner that is electrically actuatable. The image display system generally includes an image projection device, and an electrically actuatable image combiner. The image combiner may be superposed with a transparent substrate such as a visor or a windshield.

31 Claims, 5 Drawing Sheets

U.S. PATENT DOCUMENTS

| | | | |
|---|---|---|---|
| 5,243,448 A | 9/1993 | Banbury | 359/13 |
| 5,278,532 A | 1/1994 | Hegg et al. | 345/7 |
| 5,313,292 A | 5/1994 | Wood et al. | 359/13 |
| 5,343,313 A | 8/1994 | Fergason | 359/83 |
| 5,408,346 A | 4/1995 | Trissel et al. | 359/65 |
| 5,534,950 A | 7/1996 | Hargis et al. | 348/758 |
| 5,541,745 A | 7/1996 | Fergason | 359/37 |
| 5,552,935 A | 9/1996 | Knoll et al. | 359/630 |
| 5,566,025 A | 10/1996 | Knoll et al. | 359/630 |
| 5,585,967 A | 12/1996 | Monroe | 359/629 |
| 5,615,023 A * | 3/1997 | Yang | 359/13 |
| 5,619,377 A | 4/1997 | Rallison | 359/631 |
| 5,638,202 A * | 6/1997 | Rofe | 349/11 |
| 5,642,227 A | 6/1997 | Rallison | 359/631 |
| 5,646,784 A * | 7/1997 | Wilson | 359/632 |
| 5,673,151 A | 9/1997 | Rallison | 359/631 |
| 5,691,789 A | 11/1997 | Li et al. | 349/98 |
| 5,760,931 A | 6/1998 | Saburi et al. | 359/13 |
| 5,767,820 A | 6/1998 | Bassette et al. | 345/8 |
| 5,798,057 A | 8/1998 | Hikmet | 252/299.5 |
| 5,805,119 A | 9/1998 | Erskine et al. | 345/7 |
| 5,859,714 A | 1/1999 | Nakazawa et al. | 359/13 |
| 5,864,326 A | 1/1999 | Rallison | 345/7 |
| 5,874,929 A | 2/1999 | Opower et al. | 345/32 |
| 5,903,395 A | 5/1999 | Rallison et al. | 359/630 |
| 5,903,396 A | 5/1999 | Rallison | 359/630 |
| 5,920,363 A | 7/1999 | Rofe | 349/96 |
| 5,940,150 A | 8/1999 | Faris et al. | 349/16 |
| 5,949,583 A | 9/1999 | Rallison et al. | 359/633 |
| 5,973,727 A * | 10/1999 | McGrew et al. | 348/41 |
| 5,973,845 A | 10/1999 | Hildebrand et al. | 359/630 |
| 5,991,085 A | 11/1999 | Rallison et al. | 359/630 |
| 5,991,087 A | 11/1999 | Rallison | 359/631 |
| 6,005,714 A | 12/1999 | Welch | 359/576 |
| 6,055,110 A | 4/2000 | Kintz et al. | 359/637 |
| 6,181,367 B1 | 1/2001 | McGrew et al. | 348/41 |
| 6,266,194 B1 * | 7/2001 | Tanijiri et al. | 359/631 |
| 6,731,253 B1 * | 5/2004 | Arnold | 345/8 |
| 2002/0039156 A1 | 4/2002 | Li et al. | 349/88 |

* cited by examiner

IMAGE DISPLAY SYSTEM AND ELECTRICALLY ACTUATABLE IMAGE COMBINER THEREFOR

This application claims the benefit of Provisional Application Ser. No. 60/285,850, filed Apr. 23, 2001.

BACKGROUND OF THE INVENTION (1) Field of the Invention

The present invention generally relates to heads-up and/or head mounted display devices. This invention more specifically relates to a novel reflective thin film image combiner for the aforementioned devices.

(2) Background Information

Helmet mounted displays and windshield mounted displays (hereafter referred to as heads-up displays or HUDs) are increasing in importance in both military and civilian environments. For example, in a military setting, a heads-up display presents valuable information to pilots by superposing virtual images of data information over the pilots' normal field of vision. The flight parameters of the aircraft, navigational displays or any other relevant information may be viewed without the pilot moving his/her head, thereby generally improving flight performance and safety. HUDs are also finding wider usage in civilian transportation, with windshield displays becoming popular in many automobiles. Further, HUDs are beginning to find a wide range of application in the entertainment markets, such as in videos, video games, and virtual reality.

A general and basic design for a HUD 20 is shown in FIG. 1, in which a transparent substrate 22 (e.g. a visor or windshield) includes an image projection system 26 and an image combiner 24, which together superimpose display information over the user's field of view. Image projection system 26 projects optical information (generally in the form of a virtual image) towards image combiner 24, which is superposed on transparent substrate 22. The virtual image is then reflected towards the user. The user may, therefore, view the information provided by image projection system 26, without turning away from his/her normal field of vision. Image projection system 26 generally includes a cathode ray tube (CRT) or a liquid crystal display (LCD) in combination with imaging optics (e.g. mirrors and lenses).

In order to minimize any undesirable distortion to the user's target detection distance and/or color perception, image combiner 24 is generally designed as a narrow spectrum reflector, (i.e. it reflects light only in a narrow wavelength range and transmits substantially all light at other wavelengths). Existing image combiner 24 technologies generally include semi-reflective thin-film deposition coatings, holographic film coatings (see for example Moss in U.S. Pat. No. 4,880,287), or cholesteric liquid crystal based reflective coatings (see for example Berman in U.S. Pat. No. 4,900,133, which is fully incorporated herein by reference). Furthermore, image projection system 26 may be designed to project light in a narrow band, matching the reflective band of the image combiner 24.

However, despite these advancements, state of the art HUDs are generally limited in that image combiner 24 is passive (i.e. the reflectivity of the coating is constant after fabrication). If, for example, the light intensity of the outside environment is bright the user may find it difficult to read the displayed information over the bright background. Conversely, if the outside environment is dark, and the displayed information is relatively bright, the user may observe reflections of his or her face (as well as other distracting glare) superimposed on the field of view. Prior art HUDs attempt to overcome this problem by adjusting the brightness of the CRT or LCD panel in projection system 26. However, the light intensity range achievable from the projection system 26 tends to be limited and may not always satisfy practical requirements. Moreover, for some applications, the user may only be required to view the display at intermittent periods. One may turn off image projection system 26 to eliminate the display image, however, image combiner 24 remains in the user's field of view and may adversely affect the perception of outside objects, particularly since image combiner 24 is not generally perfectly transmissive.

Therefore, there exists a need for an improved HUD including an improved image combiner 24.

SUMMARY OF THE INVENTION

In one aspect, the present invention includes an image display system for displaying an image in a user's line of sight, the image display system including: an image projection device; and an image combiner being electrically actuatable between first and second states. In one variation of this aspect, the image combiner includes at least one cholesteric liquid crystal layer and at least two optically transparent, electrically conductive substrates. In another variation of this aspect, the reflectivity of the image combiner within a narrow spectrum of wavelengths may be electrically controlled over a range from less than about 10% to greater than about 90%.

In another aspect, this invention includes an image combiner for a heads up display including: at least one cholesteric liquid crystal layer; at least two optically transparent, electrically conductive substrates; the image combiner being actuatable between first and second states. In yet another aspect, this invention includes a method for fabricating a heads up display system, the method including: providing an image projection device; providing an image combiner including at least one cholesteric liquid crystal layer, wherein the image combiner is electrically actuatable between first and second states; providing a driving circuit; electrically connecting the image combiner with the driving circuit; and locating the image projection device for projecting images on the image combiner.

In still another aspect, this invention includes a method for positioning an image in a user's line of sight, the method including: positioning an image combiner including at least one cholesteric liquid crystal layer in the user's line of sight, the image combiner being electrically actuatable between first and second states; projecting an image to be combined with an image in user's line of sight on the image combiner; and selectively electrically actuating and deactuating the image combiner, wherein actuation of the image combiner from the first state to the second state substantially reduces the brightness of the projected image, and deactuation of the image combiner from the second state to the first state substantially increases the brightness of the projected image.

DETAILED DESCRIPTION

Figure 1:
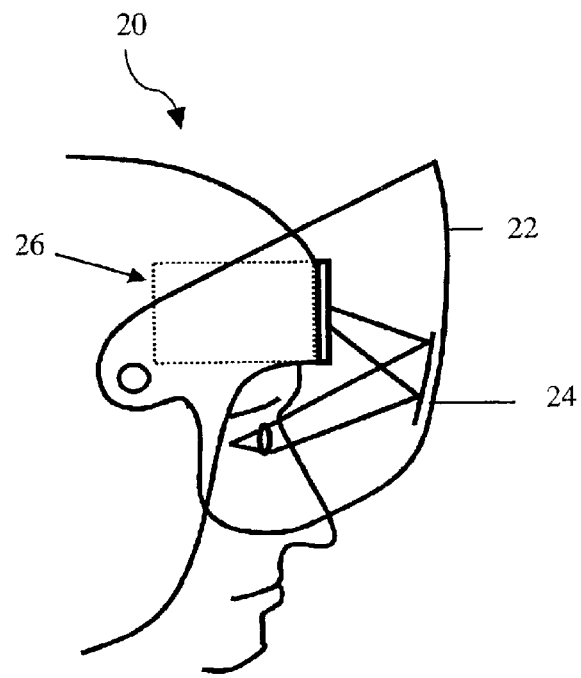
FIG. 1 is a schematic representation of a prior art helmet mounted display including an image combiner.
Figure 2:
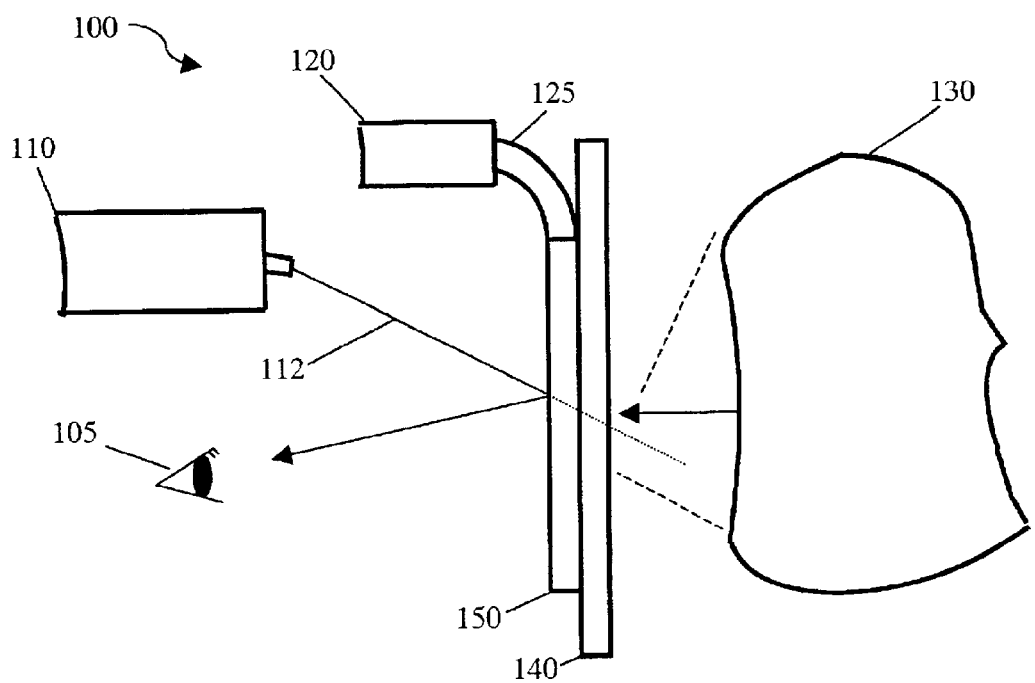
FIG. 2 is a schematic representation of an image display system, including an electrically controllable image combiner, according to one embodiment of the present invention.

Referring to FIG. 2, a system 100 according to the principles of this invention is illustrated. In general, the present invention is directed to an image display system (i.e. a HUD) including an electrically actuatable image combiner 150. System 100 generally includes an image projection device 110 and an image combiner 150, which may be superposed with a transparent substrate 140 such as a visor or a windshield. Image combiner 150 is typically electrically coupled with a driving circuit 120, having a power supply (not shown). Image combiner 150 may include one or more cholesteric liquid crystal (CLC) layers. In general, the reflectivity of image combiner 150 may be electrically adjustable, which as used herein refers to any user selectable variation in reflectivity, ranging from an "on" state (e.g., about 70% reflectivity or more) to an "off" state (e.g., about 30% reflectivity or less) and/or including partial reflectivities therebetween.

The present invention may be advantageous in that it provides a HUD (e.g. a helmet mounted display or a windshield display) that includes an image combiner 150 having an adjustable reflectivity. For example, image combiner 150 may be fabricated to have a high reflectivity (e.g. greater than about 70%) within a narrow spectrum of wavelengths in the non-energized state. However, upon the application of an electric field the reflectivity may be controllably and substantially reduced (e.g. less than about 30% within the same narrow spectrum of wavelengths). Image combiner 150 of this invention may be further advantageous in that both the bandwidth and center wavelength of the reflection band may be tuned over a wide wavelength range by adjusting the composition of the CLC material. This invention may be still further advantageous in that it provides for a relatively lightweight, easily integrateable and low cost image combiner.

As mentioned hereinabove, conventional image combiners typically fit into one of three categories: semi-reflective thin film combiners, holographic combiners, and CLC-based combiners. Semi-reflective image combiners are typically composed of a semi-reflective thin-film metallic coating (e.g. silver or aluminum) superposed on a transparent material (e.g. a visor or windshield). Conventional thin film technology generally relies on vacuum deposition processing, which tends to present difficulties when used on visors and windshields. Further, metallic thin-films do not generally adhere well to plastic substrates. Further still, thin-film coatings tend to reduce the overall amount of light transmitted through a visor or windshield, and therefore may cause a loss in visual acuity and/or color perception. In order to achieve narrow band reflective films, multi-layer films are necessary, which tend to increase costs.

Holographic image combiners are generally composed of diffraction optics (e.g. a photographic emulsion having a diffraction grating recorded thereon) sandwiched between two transparent layers, which provide structural support. Holographic image combiners may be advantageous in that they may be fabricated to reflect light in a narrow wavelength range. However, holographic image combiners do not generally transmit light with an efficiency of greater than 80% and may therefore cause a loss in visual acuity and/or color perception. Further, holographic image combiners typically require laser light to display an image and tend to require expensive equipment for fabrication.

Conventional CLC-based image combiners generally include a CLC layer or layers superposed on a transparent substrate and tend to be advantageous in that they may be fabricated to reflect light in a narrow spectrum of wavelengths with high reflection efficiencies (90% or greater). Such CLC-based image combiners also tend be relatively lightweight, easily integratable, and low cost. However, as described hereinabove, conventional CLC-based image combiners are passive (i.e. reflectivity is constant after fabrication). As a result, and as described hereinabove, these conventional CLC-based image combiners typically cause a loss of visual acuity in either (or both) bright or dark conditions.

In order to enable a comprehensive understanding of the structure and function of the present invention, a description of CLC layers and electrically actuatable CLC layers is provided, followed by a description of the HUDs of this invention.

Figure 3:
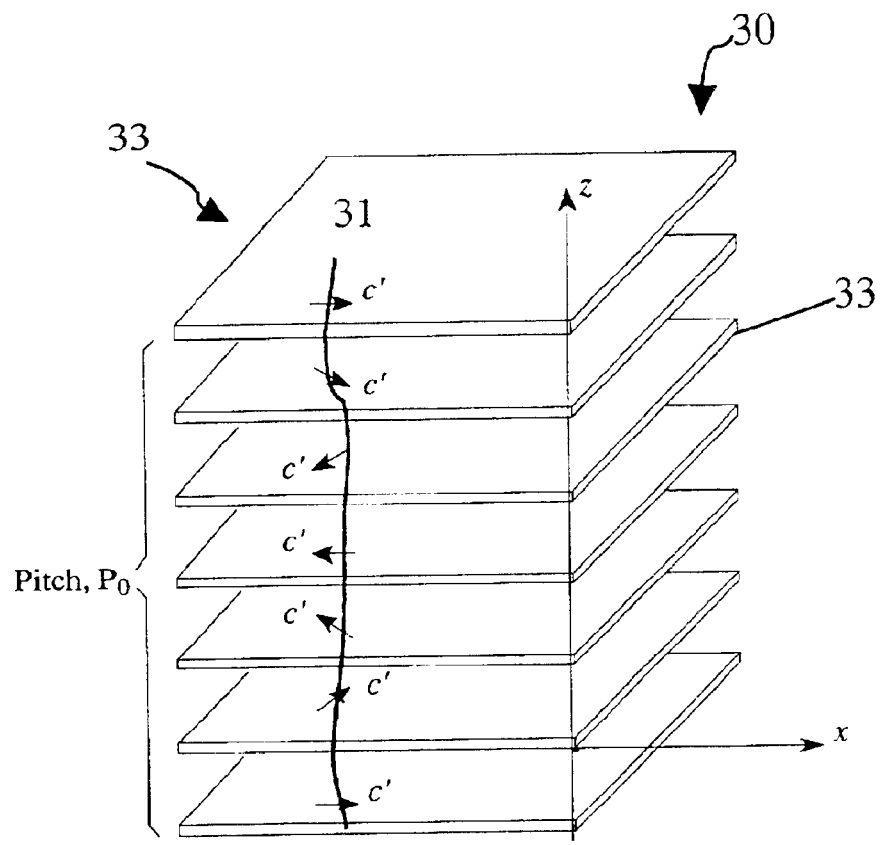
FIG. 3 is a schematic representation of a CLC layer including a plurality of molecular sub-layers having aligned molecular orientation.

Referring now to FIG. 3, a CLC film 30 (also referred to as a CLC layer) typically includes a stack of thousands of relatively planar molecular sub-layers 33. Each sub-layer includes a plurality of elongated liquid crystal molecules aligned in a common direction within the sub-layer, denoted by c'. The molecular sub-layers 33 in turn, stack together so that the orientation of the molecules in each sub-layer 33 is rotated slightly from one sub-layer 33 to the next, forming a continuous helix with an axis of rotation 31 substantially parallel to the z direction. A pitch, $P_0$, of the helix may generally be defined as the stack thickness required for c' to rotate by 360°.

CLC films 30 may be formulated with either a right-handed (clockwise) or a left-handed (counter-clockwise) helix, with an axis of rotation 31 that orients substantially perpendicular to the surface of the film. These CLC films 30 are substantially transparent to all wavelengths of electromagnetic radiation (specifically visible light), except within a spectrum of wavelengths (or bandwidth) around a selected center wavelength (e.g. 550 nm). Within that spectrum of wavelengths, a CLC film 30 having a right-handed (clockwise) helix reflects right hand circularly polarized (RH) light and transmits left hand circularly polarized (LH) light, while a CLC film 30 having a left-handed (counterclockwise) helix reflects LH light and transmits RH light.

Figure 4:
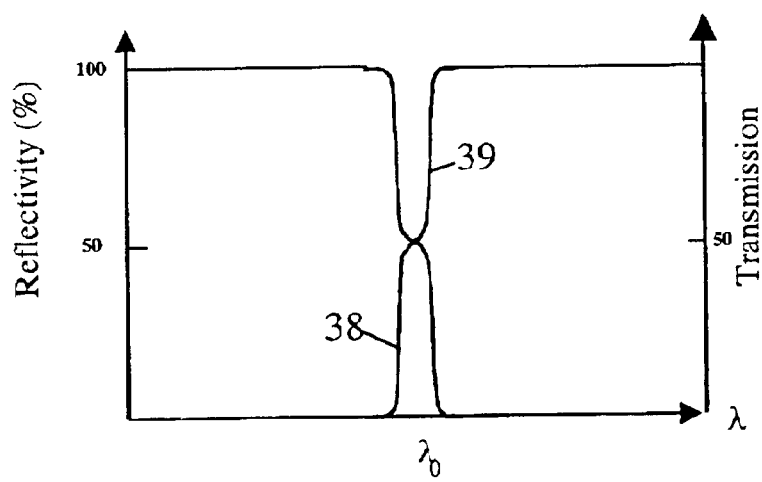
FIG. 4 illustrates typical reflection and transmission behavior as a function of wavelength for the CLC layer of FIG. 3.

The polarizing reflection bandwidth and center wavelength of a CLC film 30 generally depends on the molecular pitch distribution profile of the cholesteric liquid crystals (Li, et al., U.S. Pat. No. 5,691,789 and Li, et al., SID '96 Digest, p. 111 (1996)). The Li et al., U.S. Patent is fully incorporated herein by reference. A CLC film 30 including a right-handed helical pitch $P_0$ and average index of refraction $n_{ave}$ generally reflects RH light at a characteristic wavelength $\lambda_0 = n_{ave} P_0$, and transmits LH light at this wavelength. The bandwidth of the reflection band may be calculated as $\Delta\lambda \approx (\Delta n/n_{ave})\lambda_0$, where $\Delta n = n_e - n_o$ is the birefringence of the film. The bandwidth and center wavelength may generally be engineered by adjusting the composition and processing history of CLC film 30. In general, the bandwidth may extend from about 20 to about 2000 nanometers. As used throughout, a CLC layer having a bandwidth of less than about 100 nm is considered to have a narrow reflection band. The optical behavior of a typical CLC film 30 is illustrated schematically in FIG. 4, wherein reflectivity 38 and transmission 39 are plotted as a function of wavelength, $\lambda_0$.

Conventional CLC films 30 tend to be passive, in the sense that the above-described helical structure is fixed, and therefore, the optical properties of the film may generally not be varied by the application of an electrical field. However, recently Li et al., in U.S. patent application Ser. No. 09/093,017, and Hikmet, in U.S. Pat. No. 5,798,057 and Liq. Cryst., 26, p. 1645–53 (1999), have disclosed CLC films in which the optical properties (e.g. the reflectivity as a function of optical wavelength) may be adjusted electrically. The Li et al., patent application and the Hikmet patent and article are fully incorporated herein by reference.

Figure 5:
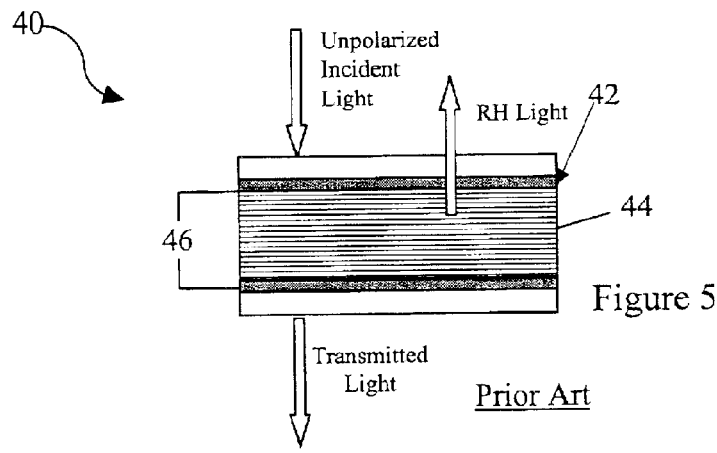
FIG. 5 is a schematic representation of an electrically adjustable CLC device.
Figure 6:
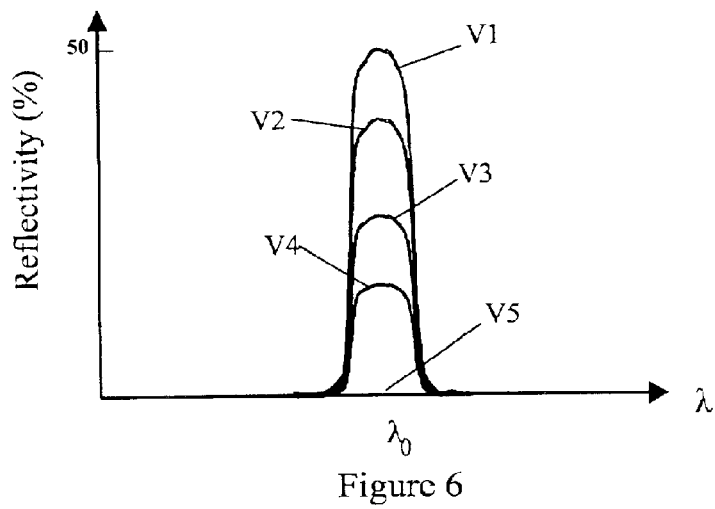
FIG. 6 is a plot of reflectivity versus wavelength for the CLC device of FIG. 5 showing a reduction in reflectivity as applied voltage is increased.

Referring now to FIG. 5, the basic structure of a CLC device 40 in which the reflective properties may be adjusted electrically is illustrated (CLC device 40 may be used as an image combiner as described hereinbelow). CLC device 40 generally includes a CLC layer 44 sandwiched between two conductive, transparent films 42. Indium tin oxide (ITO) is a preferred material for films 42. Films 42 are generally connected to a power supply 46 and may be further sandwiched between transparent (e.g. glass and/or plastic) substrates 41 to provide additional structural integrity. CLC layer 44 is similar to that described hereinabove with respect to passive CLC films 30, but is generally formulated to provide reflective properties that may be electrically adjustable. The reflective properties of CLC device 40 may generally be varied by the application of an electric field as shown schematically in FIG. 6. FIG. 6 plots reflectivity versus wavelength, $\lambda_0$, at a function of applied voltage. At applied voltages less than some threshold voltage, (e.g. $V_1$), the reflectivity of CLC device 40 is generally about 50% (reflecting either RH or LH light) within a selected spectrum of wavelengths. As the applied voltage is increased ($V_5 > V_4 > V_3 > V_2 > V_1$), the reflectivity decreases substantially, as shown. Moreover, this behavior tends to be reversible, wherein upon the removal of the electric field the reflectivity is restored.

Referring again to FIG. 2, and as described briefly hereinabove, image display system 100 generally includes an image projection device 100 and an image combiner 150, which may be superposed with a transparent substrate 140. Image projection device 110 may be any type capable of projecting images and/or symbols, which including information content, towards image combiner 150. Image projection device 110 typically includes a cathode ray tube (CRT) or a liquid crystal display (LCD) in combination with imaging optics (not shown). Image combiner 150, which is discussed in substantially more detail hereinbelow, may be joined to transparent substrate 140 using any well known technique, such as with an adhesive or a static cling vinyl. In one embodiment, image combiner 150 is joined to transparent substrate 140 with an optically transparent adhesive, such as those manufactured and sold by Norland Products, Inc., 695 Joyce Kilmer Ave., New Brunswick, N.J., 08902. Image combiner 150 is typically electrically coupled to a driving circuit 120 that includes a power supply (not shown). The electrical coupling may be made by any known method 125, but it is generally preferred to use optically transparent electrical conductors so as not to obstruct the user's field of view. One example of an optically transparent conductor is indium tin oxide (ITO), which may be deposited as thin wires on the surface of transparent substrate 140. Driving circuit 120 may be located wherever suitable, including on the visor or helmet of a helmet mounted display system, on the dashboard of a motor vehicle, or included with image display device 110 into a singe device having dual function.

Image display system 100 generally functions similarly to conventional HUDs in that an image projection system 110 projects optical information 112 (generally in the form of a virtual image) towards image combiner 150. The optical information is then reflected back towards a user 105 and is generally superimposed with objects 130 in the user's 105 field of view. User 105 may typically view the information provided by image projection system 110 without turning away from his/her normal field of view. As discussed hereinabove, the image combiner 150 of the present invention is adjustable between at least two discrete reflective states, such as off and on states. For example, in the off state (also referred to as the de-energized state), image combiner 150 has a relatively high reflectivity within a spectrum of wavelengths and therefore reflects a relatively bright image towards user 105. In the on state (also referred to as the energized state), image combiner 150 has a relatively low reflectivity, and therefore, reflects a relatively faint image towards user 105. In general, actuating image combiner 150 from an "off" state to an "on" state results in a substantial reduction in reflectivity within the reflective spectrum of wavelengths (e.g. from a reflectivity value of greater than about 70% to one that is less than about 30%). In a particular exemplary embodiment, image combiner 150 may be characterized by having a reflectivity within a spectrum of wavelengths of greater than about 90% in the first state and less than about 10% in the second state. Further, the reflectivity of image combiner 150 may be adjustably disposed in positions between the off and on states described above, to advantageously control the brightness of the image reflected towards user 105.

Figure 7:
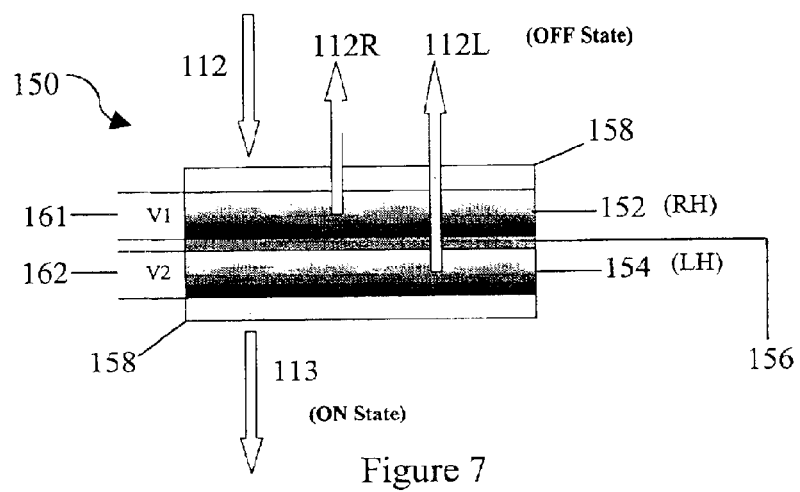
FIG. 7 is a schematic representation of one embodiment of an image combiner of this invention.

Referring now to FIG. 7, image combiner 150 generally includes first 152 and second 154 CLC layers configured to reflect RH and LH light, respectively. Image combiner 150 further includes an optically transparent, electrically conductive interlayer 156 (e.g. an ITO film or a plastic or glass substrate coated on opposite sides with ITO) disposed between CLC layers 152 and 154. Image combiner 150 is otherwise generally similar to CLC device 40, including two optically transparent, electrically conductive substrates 158 (e.g. ITO or ITO coated glass or plastic substrates) and is electrically connected to one or more power supplies 161 and 162. The voltages to CLC layers 152, 154 may be controlled individually or in unison. CLC layers 152 and 154 are similar to that described hereinabove with respect to passive CLC layer 30. The reflective properties of image combiner 150 may generally be varied by the application of an electric field. Prior to applying a voltage, image combiner 150 is generally highly reflective.

In general, the unpolarized, incident light 112 may be thought of as including equal parts RH and LH light. The RH component 112R is substantially reflected by right hand CLC layer 152, while the LH component 112L is substantially reflected by left hand CLC layer 154. Upon the application of an applied voltage (of a sufficient magnitude to fully actuate the CLC layers) to CLC layers 152, 154, the reflectivity of image combiner 150 decreases substantially, and as a result, the incident light 112 is substantially transmitted 113. Upon the removal of the electric field, the reflectivity of image combiner 150 is generally restored.

Fabrication of image combiner 150 is now described. In an exemplary fabrication process, suitable CLC materials along with non-reactive, low molecular eight (i.e., a molecular weight generally less than about 5000) liquid crystal materials and optionally others such as chiral materials) are provided and well mixed. Two or more transparent and conductive substrates (e.g. ITO substrates or ITO coated glass or plastic substrates) are coated with polyimides (typically by the well known process of spin-coating). After a baking process, in which the coated substrates are exposed to a moderately high temperature for a predetermined period of time (for example, when using a polyimide commonly known as 'polyimide 7311', the baking procedure would include exposure to 80° C. for 15 minutes, followed by 180° C. for 60 minutes), the substrates are rubbed undirectionally. The substrates are then superposed with suitable spacers between them to control the thickness of the CLC layer(s). Optionally, an image combiner having two CLC layers (as illustrated in FIG. 7) may be fabricated in the foregoing manner by superposing three transparent substrates (with suitable spacers). The above-described material mixture is then disposed between the substrates and the stack exposed to UV radiation for curing of the CLC materials.

Hikmet et al., in Liq. Cryst., 26, p. 1645–53 (1999), disclose one possible material recipe for image combiner 150. The Hikmet recipe includes 30 wt % chiral acrylate monomer CBC6, 44 wt % BL64 low molecular liquid crystal, 26 wt % chiral material CB15, and 0.6 wt % dia-acrylate monomer C6M. CB15 [4'-(2-methylbutyl)-4-cyanobiphenyl] is commercially available and used as a non-reactive chiral dopant in order to be able to choose the position of the reflection at a desired acrylate concentration. According to the previously mentioned literature, BL64 is a commercially available mixture containing cyano-biphenyl and -terphenyl compounds available from Merck Ltd. (Poole, UK). The chemical compositions of CBC6 and C6M are as shown below:

the reflectivity may be controllably adjusted to levels between the 'off' and 'on' states.

Figure 8:
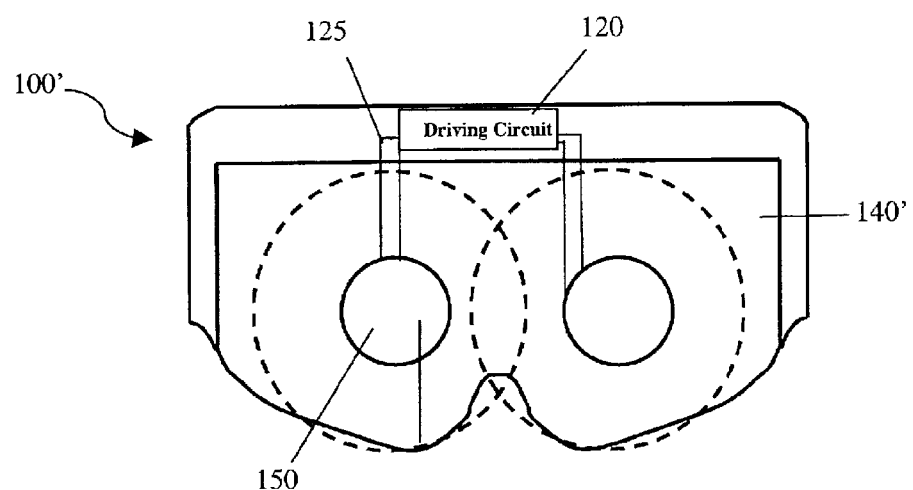
FIG. 8 is a schematic representation of a goggles (or other eyewear) mounted display system in accordance with this invention.

Referring to FIG. 8, a goggles mounted display system 100' in accordance with this invention is illustrated. System 100' include an electrically controllable image combiner 150 electrically connected by transparent wires 125 (typically ITO) to a driving circuit 120 having a power supply (not shown). System 100' may include one or more image combiners 150. As illustrated in FIG. 8A, system 100' includes two image combiners, one for each of the user's eyes. System 100' may also include one image combiner 150, either centrally located or in the line of sight of one eye. An image projection device is not shown, but may be located wherever suitable for proper projection of the display images.

Figure 9:
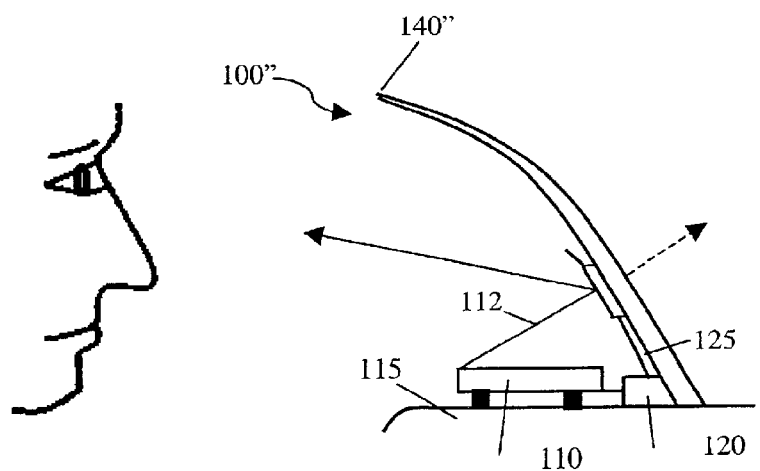
FIG. 9 is a schematic representation of a windshield display system in accordance with this invention.

Referring to FIG. 9, a windshield display system 100" in accordance with this invention is illustrated. System 100" includes an image projection system 110, often mounted to the dashboard 115 of the motor vehicle. System 100" further includes at least one image combiner 150 disposed on a windshield 140" and electrically connected by transparent (or thin) wires 125 to a driving circuit 120 having a power supply (not shown). Image combiner 150 may include ITO coated plastic substrates 158 (see FIG. 7) in order to provide flexibility for fitting the curvature of windshield 140". Driving circuit 120 is typically mounted to dashboard 115, but may be mounted in any other suitable location (e.g. with any other electronic devices included in the motor vehicle).

Figure 10:
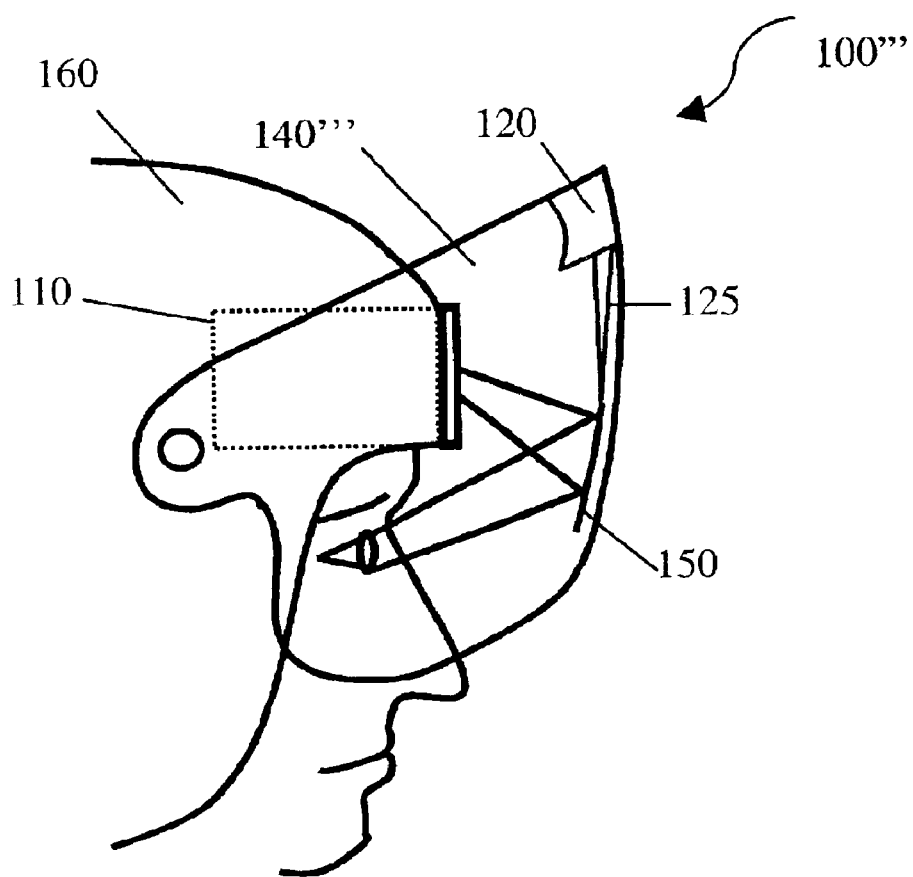
FIG. 10 is a schematic representation of a helmet mounted display system in accordance with this invention.

Referring to FIG. 10, a helmet mounted display system 100''' according to this invention is illustrated. System 100''' includes an image projection system 110 typically mounted to the helmet 160. System 100''' further includes at least one image combiner 150 disposed on the visor 140''' and electrically connected by means of transparent wires to a driving circuit 120, having a power supply (not shown). Image combiner 150 may include ITO coated plastic substrates 158 (see FIG. 7) in order to provide flexibility for fitting the curvature of visor 140'''. Driving circuit 120 is typically mounted in either visor 140''' (as shown) or to helmet 160.

FIGS. 8–10 illustrate three example HUDs including electrically adjustable image combiners. These are intended to be exemplary, rather than inclusive. Other HUD embodiments including electrically adjustable image combiners are

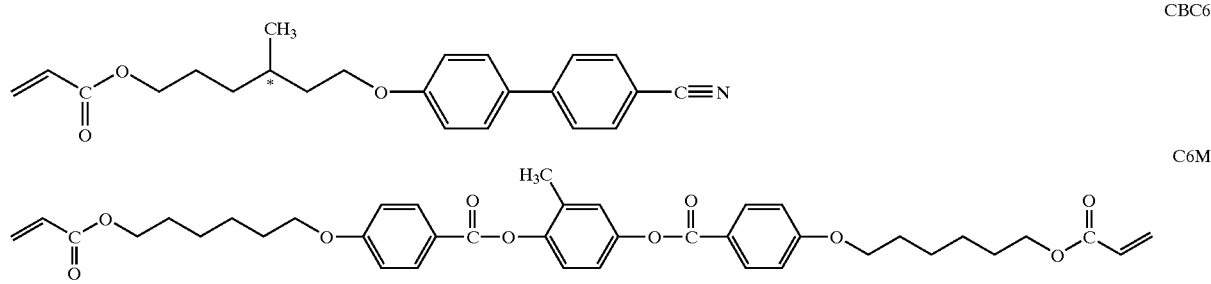

C6M is commercially available, and the skilled artisan will have the ability to synthesize CBC6 in light of the foregoing.

An image combiner fabricated using the Hikmet CLC material recipe generally includes a reflection band centered at about 540 nm with a bandwidth of about 50 nm. At applied voltages of less than about 32 volts the reflectivity is relatively high (i.e. 'on'), while at voltages greater than about 34 volts the reflectivity is relatively low (i.e. 'off'). At applied voltages in the range of about 32 to about 34 volts deemed to be within the scope and spirit of this invention. In addition, the modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What we claim is:

1. An image display system for displaying an image in a user's line of sight, said image display system comprising:
   an image projection device;
   a transparent substrate; and
   an image combiner being electrically actuatable between a first high reflectivity state and a second low reflectivity state, said image combiner joined to said transparent substrate, said image combiner composed of an optically transparent conductor.

2. The image display system of claim 1 comprising a helmet mounted display.

3. The image display system of claim 2 wherein said image combiner is disposed on a visor.

4. The image display system of claim 1 comprising a windshield display.

5. The image display system of claim 4 wherein said image combiner is disposed on a motor vehicle windshield.

6. The image display system of claim 1 wherein said image projection device comprises a liquid crystal display.

7. The image display system of claim 1 wherein said image projection device comprises a cathode ray tube.

8. The image display system of claim 1 wherein said image projection device projects said image within a narrow band spectrum of light.

9. The image display system of claim 1 wherein said image combiner comprises at least one cholesteric liquid crystal layer having a reflection band.

10. The image display system of claim 9 wherein said reflection band is narrow.

11. The image display system of claim 10 wherein said reflection band has a center wavelength of about 540 nm and a bandwidth of less than about 100 nm.

12. The image display system of claim 9 wherein said at least one cholesteric liquid crystal layer comprises a mixture of a cholesteric liquid crystal material and another liquid crystal material having a molecular weight less than about 5000.

13. The image display system of claim 12 wherein said cholesteric liquid crystal layer comprises a mixture of a first material, a second material and a third material, said first material being a cholesteric liquid crystal material, said second material being a liquid crystal material having a molecular weight less than about 5000, and said third material being a chiral material.

14. The image display system of claim 9 including one cholesteric liquid crystal layer disposed between two optically transparent, electrically conductive substrates.

15. The image display system of claim 14 wherein each of said two optically transparent, electrically conductive substrates comprise indium tin oxide.

16. The image display system of claim 9 comprising two cholesteric liquid crystal layers with an optically transparent, electrically conductive interlayer disposed therebetween.

17. The image display system of claim 16 wherein said two cholesteric liquid crystal layers are disposed between two optically transparent, electrically conductive substrates.

18. The image display system of claim 17 wherein said two substrates and said interlayer each comprise indium tin oxide.

19. The image display system of claim 17 wherein said two substrates each comprise an indium tin oxide coated glass substrate.

20. The image display system of claim 17 wherein said two substrates each comprise an indium tin oxide coated plastic substrate.

21. The image display system of claim 1 further comprising a driving circuit for actuating and deactuating said image combiner, said driving circuit comprising a power supply.

22. The image display system of claim 21 wherein said driving circuit provides a voltage in the range from about 0 to about 50 volts.

23. The image display system of claim 20 wherein optically transparent couplers are used to couple said driving circuit to said image combiner.

24. The image display system of claim 23 wherein said optically transparent couplers comprise indium tin oxide.

25. The image display system of claim 1 wherein said image combiner is disposed on an optically transparent substrate with an optically transparent adhesive.

26. The image display system of claim 25 wherein said optically transparent adhesive comprises a UV curable adhesive.

27. The image display system of claim 1 wherein actuation of said image combiner from said first state to said second state substantially reduces the reflectivity of said image combiner.

28. The image display system of claim 1 wherein deactuation of said image combiner from said second state to said first state substantially increases the reflectivity of said image combiner.

29. The image display system of claim 1 wherein the reflectivity of said image combiner in said first state within a narrow spectrum of wavelengths is greater than about 90%.

30. The image display system of claim 1 wherein the reflectivity of said image combiner in said second state within a narrow spectrum of wavelengths is less than about 10%.

31. The image display system of claim 1 wherein the reflectivity of said image combiner within a narrow spectrum of wavelengths may be electrically controlled over a range from less than about 10% to greater than about 90%.

* * * * *